April 25, 1961  M. E. LOWER  2,981,585
SPEED AND MILEAGE RECORDING SYSTEM
Filed June 10, 1958  2 Sheets-Sheet 2

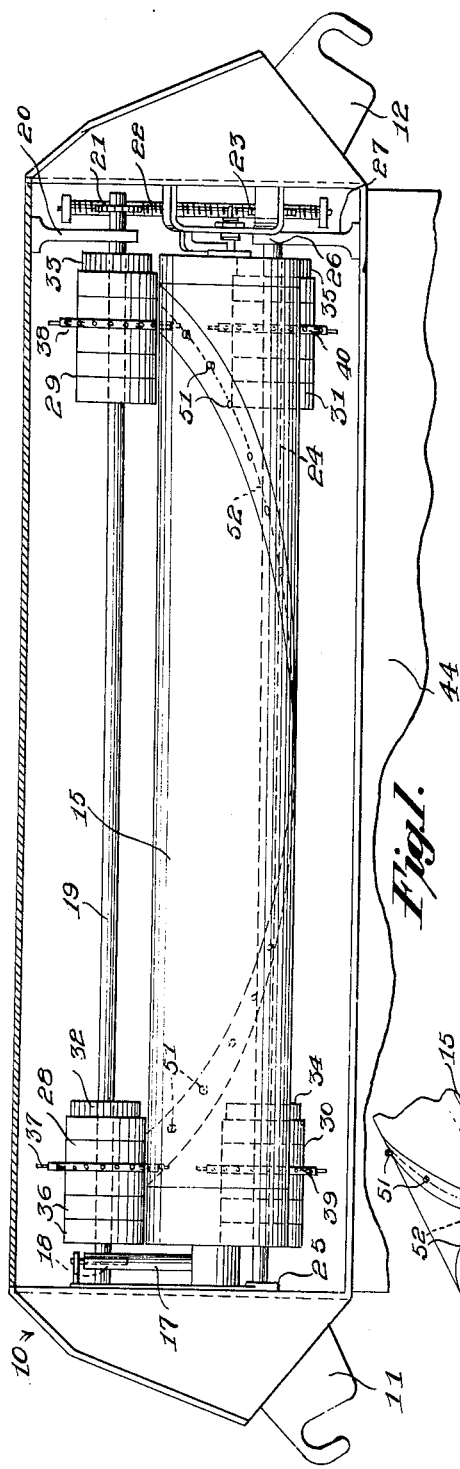

INVENTOR
Mary Edith Lower

BY Herbert M Birch
ATTORNEY

United States Patent Office 2,981,585
Patented Apr. 25, 1961

2,981,585

SPEED AND MILEAGE RECORDING SYSTEM

Mary Edith Lower, 1515 Ogden St. NW.,
Washington 1, D.C.

Filed June 10, 1958, Ser. No. 741,160

4 Claims. (Cl. 346—18)

The present invention relates to means for making a permanent speed record on a record chart for mileage periods of vehicle travel, according to the speed of a vehicle in conjunction with the vehicle speedometer drive and odometer mechanism.

As has often happened in cases of accident, particularly when the driver has become unconscious, it is impossible even when witnesses are available to accurately determine the speed of travel of the vehicle at the time of the accident or to determine the vehicle speed per mile prior to the accident. It is an object of this invention to provide a permanent record that will automatically be recorded as long as the vehicle is in motion, whereby the speed of the vehicle may be accurately recorded under all conditions.

Another object is to provide a novel arrangement of styli for use with speedometers of the indicator drum type such as illustrated in Patent No. 2,802,442, issued August 13, 1957.

Another object is to provide a novel recording chart drive and marking arrangement with the use of a modified speedometer indicator drum, wherein said chart is made of a coated electro-sensitive paper, such as the well known special recording paper used in telegraph work.

A further object is to provide a novel combined speedometer and recording chart casing of a compact and readily attachable size and construction for the attachment to the dashboard of a motor vehicle.

The foregoing objects are attained by combining a recording apparatus with a speed responsive speedometer indicator drum, which apparatus produces a series of marks at regular intervals according to the indication of speed given by the indicator drum at intervals of space on an electro-sensitive chart representative of distance in miles. For example, the variations in speed are shown by lateral displacements of the marks on the chart made by a plurality of helically spaced styli positioned at regular intervals along helical conductor wire embedded in the indicator drum of the speedometer. The laterally displaced marks may be made longitudinally on the chart at regular intervals representative of distance in miles or fractions thereof, for example, and the chart is fed by odometers to accomplish accurate distance markings in synchronism or coordination with the speed of the vehicle.

A more thorough understanding of the invention may be had by reference to the accompanying drawings, wherein;

Figure 1 is a front view of the casing showing the speedometer index drum, chart and odometer drive therefor and the helical styli thereon, with the usual marking plate and speed scale or indicia plate removed;

Figure 2 is an end transverse cross section view of the chart odometer drive, illustrating their intercorrelated drive connection with each other to advance the web of the chart and the respective positions in relation thereto of the styli on the speed drum indicator and the ground electrode, which coact to cause the electrical chart marking;

Figure 3 is one brush arrangement for connecting a battery with the speedometer index drum shaft and to energize the wire and associated styli;

Figure 4 is a diagrammatic illustration of an electric circuit for controlling the marking currents in the styli mounted in the index drum.

Figures 5, 6:
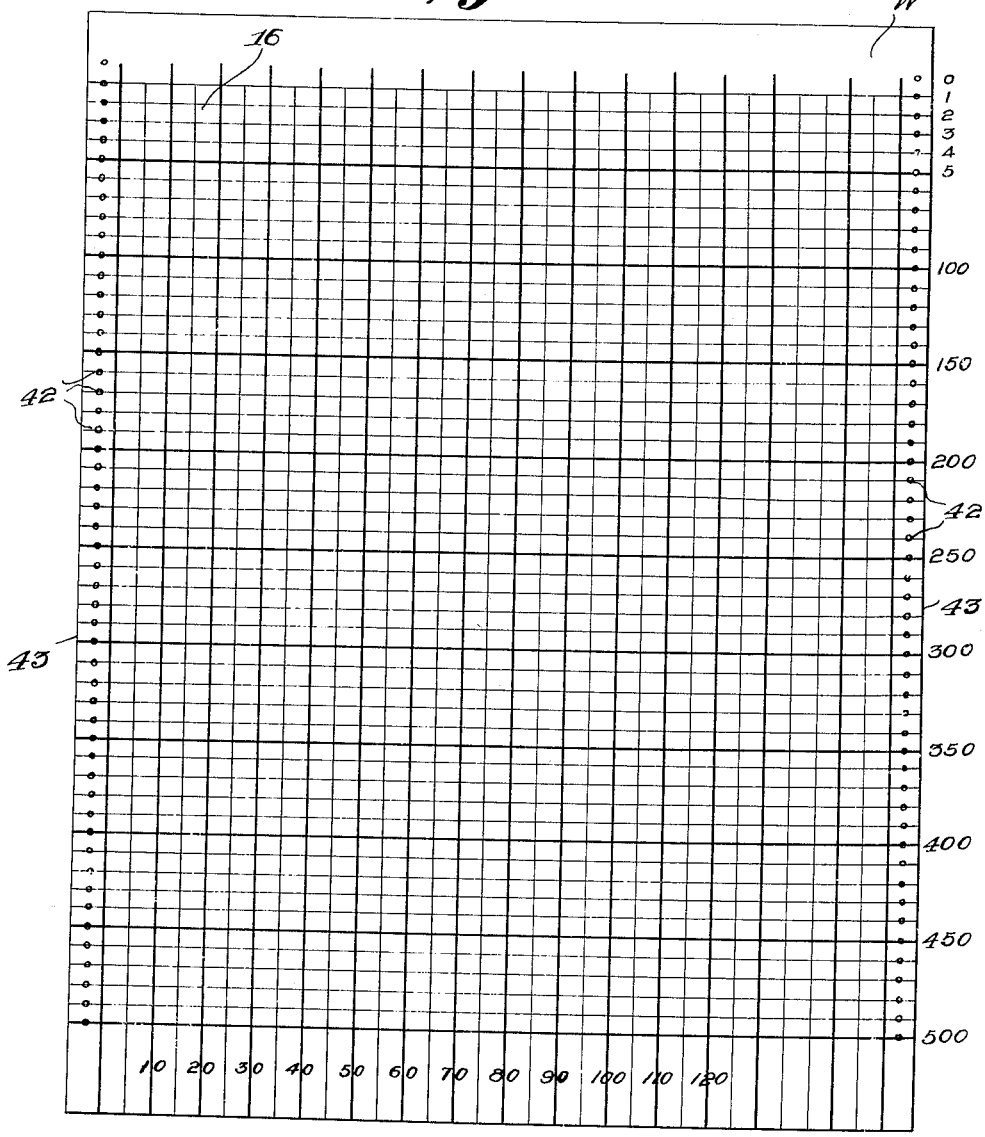
Figure 5 is a front elevation view of a section of chart used with the present invention.
Figure 6 is an end view of the chart shown in Figure 5.

Referring to the drawings in detail, and first with particular reference to Figures 1 and 2, my invention comprises a casing 10 formed with end mounting brackets 11 and 12 for connection to the dash panel, not shown, of a vehicle. The casing 10 to the rear of bracket 11 includes a speedometer cable drive connection, see Patent No. 2,802,442, which controls the rotation of an index drum 15 marked in contrasting color as is well known in the art, that is, with a helical dual color combination. The contrasting edge between colors is masked by the usual masking plate and dial indicia spaced along an elongated slot through which the color edge is progressively visible as the indicator drum 15 turns. The masking plate and dial plate indicia attach to the front of the casing 10 below the lower edge of a slanting transparent viewing window 14, positioned to expose the printed or marked portion of the web portion W of an electro-sensitive coated chart 16, hereinafter described in detail with reference to Figure 5.

The speed responsive drum 15, according to this invention is modified to operate as a recording stylus and is driven and positioned as is well known in the art to indicate the speed of the vehicle and in synchronous driven relation therewith is a take-off worm shaft 17, which drives a pinion gear 18 on an elongated odometer drive shaft 19 hereinafter referred to as a first odometer shaft. This shaft 19 extends longitudinally adjacent the longitudinal axis of the speed indicator drum 15 and is journalled in the side of the casing 10 at one end and in a bracket 20 adjacent the opposite end of the casing. This end of the shaft 19 is free of the end wall of the casing 10 and has keyed thereto a pinion gear 21, which meshes with a worm drive shaft 22. The worm shaft 22 in turn meshes with a pinion gear 23 keyed to a second elongated odometer shaft 24 journalled to rotate in bearings 25 and 26. Bearing 26 is seated in a bracket 27 secured to the casing 10. This second odometer shaft 24 is positioned in substantially vertical alignment below the first odometer shaft 19 and is turned in synchronism with the shaft 19 through the worm gear drive 21, 22, 23 in coordination with the distances travelled in miles by the vehicle.

Each odometer shaft 19 and 24, respectively, mount thereon a pair of standard odometers 28—29 and 30—31, one adjacent each end of each respective shaft. These odometers are driven off of the usual speedometer cable drive in any suitable manner, for example, by gears 32, 33, 34, and 35 in each odometer, which gears may be keyed to their respective odometer shafts to provide the actuation of the odometer mileage numeral wheels 36, as is well known in the art. These odometers each include a chart driving sprocket or a cog wheel, 37, 38 and 39, 40, respectively, each of which wheels being keyed to their respective odometer shafts, to thereby rotate therewith as long as the vehicle on which the device is installed is in motion.

The sprocket wheels are in mesh with the openings 42 along the side longitudinal edges 43 of the web W of the chart 16, illustrated in Figure 5, and thus feed the web of the chart through the device for the desired speed recording per unit of movement thereof, as will be more fully described hereinafter. Obviously, the unit of chart movement is accurately correlated with the mileage due to the operational control of the chart drive sprockets by the odometers 28, 29, 30 and 31.

The chart 16, illustrated in Figure 5, may be calibrated or plotted in tear-off sections, if desired, in blocks of 10 miles per hour, such as 10, 20, 30 etc. to 120 or more along the transverse lower edge, the marginal odometer drive openings 42 placed in units of distance, for example, every space is a mile or ten miles in ratio to the odometer unit used as the sprocket, and the longitudinally lined graph sections plotted in units of speed per distance, such as miles per hour.

Thus in operation as the drum 15 turns from the zero or null position, the first stylus comes opposite the grounding roller 48 at 10 miles per hour, the second stylus at 20 miles per hour, the third at 30 miles per hour and so on. These respective styli positions mark the chart laterally at these points by making a smudge spot thereon for each arcing action between the respective stylus and the ground electrode or roller 48. Meanwhile the odometers 28, 29, 30 and 31 are feeding the chart web W according to their drive of the odometer sprocket wheels 37, 38, 39 and 40, which are in mesh with the chart marginal openings 42.

The casing 10, see Figure 2, may be formed with a lower chart holding compartment 44. The chart 16 may be in rolls mounted on a rotatable spindle 45 or in folded strip form. The chart pays out of the chamber through an elongated slot 46, partially reeves around the spaced sprockets or cog wheels 39 and 40 driven by the lower odometer shaft 24, around the under side of a guide plate 47 and an elongated conductor roller 48, which is grounded to the casing 10 through the guide plate and thence over and around the sprocket or cog wheels 37 and 38 driven by the upper or first odometer shaft 19 and out through an elongated slot 49 into a chart web receiver box 50. This box is preferably detachable and replaceable, so the recorded charts and box may be removed when desired to study the recordings.

The speedometer indicator drum 15 is modified to include the said helical electrode or wire 52, which is preferably embedded in the insulation substance of the drum along the contrast color edge of the drum, and may be made with means which project radially outward from the wire and circumferential surface of the drum. Such means are in effect uniformly spaced styli 51, see Figures 1, 2 and 3. The helical wire is connected to a suitable source of current, such as the vehicle battery 53, see Figure 4. This styli wire 52 connects from a suitable electrical brush connection 54 through lead 55, condenser 56 and resistance 57 to the positive pole 58 of the battery. This arrangement provides for trickler charging of the control condenser 56 to avoid constant drain on the battery 53. For example, the condenser controls the discharge through the electrode or wire 52 to the particular stylus coming into an aligned spaced position with the casing grounded electrode roller 48.

Thus in operation it is to be observed that the styli drum 15 is oscillated on its axes against the returning action of a hairspring 60 by means of the drive take-off connection with the speedometer index actuator mechanism; and this being the index means of the speedometer is instantaneous for every acceleration. As disclosed the extent of the drum rotation is limited by a stop pin 61, which in this instance is set to a 120 miles per hour limit, see Figure 2.

Current from the battery 53 is supplied to the styli 51 projecting from the drum 15 through the brush connection to the helical or spiral wire 52 embedded in the insulation of the drum, which wire as previously stated extends completely around the same in a helical path of 360 degrees. Each stylus of the styli group is representative of an index of speed on the speedometer scale, that is, starting at 10, 20, 30, 40, 50 or more miles per hour. As previously explained the chart 16 is made with graphically calibrated sections of from 10 to 120 miles per hour in unit areas of 10 miles at which points the styli will mark the chart. The chart is moved by the respective sprocket wheels of each of the odometers, which odometers are actuated in synchronism by a suitable drive connection with the speedometer cable connection take-off from the vehicle ground wheels and the chart pays off to and over a duplicate vertically spaced shaft with a similar odometer on each end rotatable by a connector shaft and worm gear train in positive synchronism with the first odometer system, whereby the chart is caused to travel in an even line of travel at a speed in proportion to the speed of the vehicle.

The chart is formed of "telefax" paper and its web traverses over an elongated roller formed of conducting material, which roller is grounded to the case 10 through the metal guide plate 47. Thus as the vehicle becomes mobile the chart travels over the grounded conductor roller or electrode and the styli 51 on the drum 15 are positioned in coordination with the index spiral color line of the speedometer drum according to the instantaneous accelerations of the vehicle, whereby the position of the point of a respective stylus at the roller will produce a marking potential in the form of a flash or arc between the point and the roller and cause a mark or smudge on the chart material to indicate the speed at that moment of acceleration. As the acceleration varies the mark will change position accordingly. The actual marking may be arranged to provide the arcing or marking action at desired intervals by providing timer circuitry, for example, the present R.C. circuit may be controlled by varying the resistance and the condenser capacitance.

The odometer sprocket wheels are turned with their respective cogs engaged in the chart apertures so that the sprocket wheels 37 and 38 on the first shaft 19 rotate in a clockwise direction and impart a counter-clockwise rotation to the second shaft and the sprocket wheels 39 and 40, to thereby feed the chart web W from the roll 16 into the receiver box 50. These odometers may be grounded through the metal odometer sprockets, if desired.

Without further description it is believed that the present invention is clearly understandable. While only one embodiment of the invention is described and illustrated in detail, it is to be expressly understood that other combinations, modifications and arrangements of the parts which will now occur to others skilled in the art are to be considered a part hereof. To determine the scope of the present invention reference should be had to the appended claims.

What is claimed is:

1. An electrical recording apparatus for a speed responsive speedometer indicator drum having a spiral index area marked thereon, said drum being modified by embedding therein a helical conductor wire formed with uniformly spaced radially projecting styli, said drum being rotatably responsive to motion of a vehicle on which the speedometer is installed, an electro-sensitive chart driven adjacent the drum, speedometer actuated odometer means for driving said chart, an elongated electrode extended transverse the rear side of the chart web, said electrode being adapted to form part of an electric circuit including said respective spaced styli when the same is aligned opposite any of said styli, thereby providing an arc to mark said chart in cooperation with the rotating motion of said drum.

2. An electrical speed indicating apparatus for wheeled vehicles comprising a rotary speed responsive drum with a spiral indicator index line and having a helical electrical contact member supported thereon complementary in formation to said spiral index line, an electrically grounded elongated bar arranged to be positioned in cooperative circuit operating relationship to the drum and helical member so as to bring said elements to align opposite each other, a support for said bar, means to feed an electro-sensitive record receiving strip between the drum and the bar with said helical member having spaced projection, means adapted to contact said strip, means to maintain a charge of current in the bar and in the helix and projections thereon, a battery connected through a conductor to said helical member, and a control circuitry in series between the battery and the said member.

3. The apparatus described in claim 2, wherein the speed indicating apparatus is a vehicle speedometer and said helical member includes a wire embedded in the said speed responsive drum with radial outwardly projecting styli adapted on rotation of the drum to progressively align with said bar.

4. A speedometer having a metal casing with a viewing aperture, an elongated drum type index indicator means, said drum being marked with a spiral index line, marking current energized styli mounted on the drum along a path similar to said spiral line to complete an electrical arcing circuit, and including recording mechanism comprising a plurality of odometer means each having a chart driving cog wheel, a chart web formed along each marginal edge with cog receiving openings, said chart being chemically treated to be marked by electrical impulses initiated by any one of said current energized styli at a circuit completing position, and an electrode grounded to said casing for closing the circuit with said styli supporting a portion of the chart web, said chart being formed in sections, said sections along the lower transverse edge being divided into units of speed per hour and said marginal openings being numbered in units of distance.

References Cited in the file of this patent

UNITED STATES PATENTS

| | | |
|---|---|---|
| 1,706,044 | Taylor | Mar. 19, 1929 |
| 2,169,230 | Martile | Aug. 15, 1929 |
| 2,561,476 | Lang | July 24, 1951 |
| 2,635,032 | Shea | Apr. 14, 1953 |
| 2,718,448 | Powers | Sept. 20, 1955 |
| 2,802,442 | Helgeby | Aug. 13, 1957 |